(12) United States Patent
O'Neil et al.

(10) Patent No.: US 11,853,333 B2
(45) Date of Patent: Dec. 26, 2023

(54) TEXT PROCESSING APPARATUS AND METHOD

(71) Applicant: CANON MEDICAL SYSTEMS CORPORATION, Otawara (JP)

(72) Inventors: Alison O'Neil, Edinburgh (GB); Matus Falis, Edinburgh (GB)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 359 days.

(21) Appl. No.: 17/011,363

(22) Filed: Sep. 3, 2020

(65) Prior Publication Data

US 2022/0067074 A1   Mar. 3, 2022

(51) Int. Cl.
| | |
|---|---|
| *G06F 16/00* | (2019.01) |
| *G06F 16/31* | (2019.01) |
| *G06F 40/247* | (2020.01) |
| *G06N 3/08* | (2023.01) |
| *G06F 16/332* | (2019.01) |
| *G06F 18/214* | (2023.01) |

(52) U.S. Cl.
CPC ........ *G06F 16/313* (2019.01); *G06F 16/3329* (2019.01); *G06F 18/2148* (2023.01); *G06F 40/247* (2020.01); *G06N 3/08* (2013.01)

(58) Field of Classification Search
CPC ... G06F 16/313; G06F 40/247; G06K 9/6257; G06N 3/08
USPC ........................................................ 707/748
See application file for complete search history.

(56) References Cited

U.S. PATENT DOCUMENTS

| | | | | |
|---|---|---|---|---|
| 8,700,589 | B2* | 4/2014 | Tymoshenko | G16Z 99/00 707/706 |
| 2003/0028512 | A1* | 2/2003 | Stensmo | G06F 16/3346 |
| 2007/0294289 | A1* | 12/2007 | Farrell | G06F 16/9024 |
| 2008/0201280 | A1* | 8/2008 | Martin | G06N 20/00 706/45 |
| 2008/0228769 | A1* | 9/2008 | Lita | G16Z 99/00 |
| 2013/0066870 | A1* | 3/2013 | Somasundaran | G16Z 99/00 707/E17.091 |
| 2014/0067847 | A1* | 3/2014 | Barbieri | G16H 50/70 707/765 |
| 2016/0335403 | A1* | 11/2016 | Mabotuwana | G16H 15/00 |
| 2018/0078792 | A1* | 3/2018 | Ollila | A61N 5/1031 |

(Continued)

FOREIGN PATENT DOCUMENTS

| | | | | |
|---|---|---|---|---|
| CN | 109256216 | * | 8/2018 | G06F 40/126 |
| CN | 111026710 A | * | 4/2020 | |

OTHER PUBLICATIONS

Mutus Falis et al., "Ontological attention ensembles for capturing semantic concepts in ICD code prediction from clinical text", https://www.researchgate.net/publication/336995985, Jan. 2019, 11 pages.*

*Primary Examiner* — Monica M Pyo
(74) *Attorney, Agent, or Firm* — Oblon, McClelland, Maier & Neustadt, L.L.P.

(57) ABSTRACT

An apparatus for medical text processing comprises processing circuitry configured to: obtain a trained model, wherein the trained model is trained to classify medical text documents with a medical classification code; apply the trained model to at least one medical text document to obtain weightings for text terms included in the at least one medical text document, wherein the weightings are associated with the medical classification code; and use the weightings to perform a searching or indexing process.

15 Claims, 11 Drawing Sheets

(56) References Cited

U.S. PATENT DOCUMENTS

2021/0049401 A1* 2/2021 Jean .................... G06F 16/5846
2021/0342624 A1* 11/2021 Wang .................... G06V 20/10

* cited by examiner

| Description: Sepsis, possible SBP. A 53-year-old Hispanic man with diabetes, morbid obesity, hepatitis C, cirrhosis, history of alcohol and cocaine abuse presented in the emergency room for ground-level fall secondary to weak knees. |

~200

| FAMILY HISTORY: Positive for high blood pressure and heart disease. His father died in his 50s with an acute myocardial infarction. |

~202

| He underwent laser surgery for the prostate earlier today. Before surgery, the patient's blood pressure was 181/107. The patient received IV labetalol. Blood pressure improved, but postsurgery, the patient's blood pressure went up again to 180/100. |

~204

| Coronary stenting. History of high blood pressure, as well. He has erectile dysfunction and has been treated with Viagra. |

~206

| The patient has hypertension. He denies difficulty with chest pain, palpations, orthopnea, nocturnal dyspnea, or edema. |

| He underwent laser surgery for the prostate earlier today. Before surgery, the patient's blood pressure was 181/107. The patient received IV labetalol. Blood pressure improved, but postsurgery, the patient's blood pressure went up again to 180/100. |

~204

| Coronary stenting. History of high blood pressure, as well. He has erectile dysfunction and has been treated with Viagra. |

~206

| FAMILY HISTORY: Positive for high blood pressure and heart disease. His father died in his 50s with an acute myocardial infarction. |

TEXT PROCESSING APPARATUS AND METHOD

FIELD

Embodiments described herein relate generally to a text processing apparatus and method, for example an apparatus for applying a trained model to medical text documents to perform a search process or indexing process.

BACKGROUND

It is known to perform natural language processing (NLP), in which free text or unstructured text is processed to obtain desired information. For example, in a medical context, the text to be analyzed may be a clinician's text note. The clinical text note may be stored within an Electronic Medical Record. The text may be analyzed to obtain information about, for example, a medical condition or a type of treatment. Natural language processing may be performed using deep learning methods, for example using a neural network.

It has been found that clinical text, for example clinical text held within an Electronic Medical Record, may be difficult to search. Typically, the text comprises specialist terminology. Terms used within the text may be abbreviated. In some circumstances, a single term may be abbreviated in multiple different ways.

Some terms used within the text may be ambiguous. Some terms may be written incorrectly. For example, a typographical error or misspelling may have been made when inputting the clinical text. Some terms may require contextual knowledge to understand.

The clinical text may often use terms which are synonyms. For example, one or more brand names may be used instead of a scientific name for a medication.

If a search is performed on clinical text using a single search term, the search may not retrieve all relevant information relating to the search term. For example, if a search application searches for matches to the single search term 'alcohol', the search application may not pick up terms such as 'ETON', which is commonly used as a shorthand for alcohol. The search application may not pick up terms such as 'acamprosate', which is a medication used to treat alcohol misuse, and may therefore be indicative of alcohol use.

A simple search on a single search term may encounter issues with, for example, negation, uncertainty, laterality and/or coreference resolution.

Negation is when a term is expressed as a negative. For example, a search for 'alcohol' may return an entry including the text 'denies use of alcohol'. This entry may not be considered to be useful if the reason for searching 'alcohol' has been to find instances of alcohol use.

Uncertainty may be expressed in the text by use of, for example, 'possible' in front of an event or diagnosis. A simple text search may not reflect a degree of certainty or uncertainty in the search term.

Laterality may include consideration of whether a symptom is present on the right or left of the body. If a simple search on the symptom is used, it may be difficult to distinguish occurrences on the right from occurrences on the left.

Coreference resolution may involve distinguishing the person to whom a text item refers. It is common for clinical text to include a family history. A simple text search may not be able to distinguish text referring to the patient from text referring to another individual. For example, a search on the term 'alcohol' may include a reference to alcohol use by a parent of the patient rather than by the patient.

Clinical coding systems are known. Clinical coding systems may also be known as terminologies or ontologies. Clinical coding system express clinical concepts together with their relationships. Known clinical coding systems such as SNOMED CT (Systematized Nomenclature of Medicine—Clinical Terms), ICD-10 (the 10th revision of the International Statistical Classification of Diseases and Related Health Problems) and OCPS-4 (OPCS Classification of Interventions and Procedures version 4) are well-resourced and comprehensive. Clinical coding systems include clinical concepts and relationships between those concepts.

Known clinical coding systems include lists of synonyms for certain clinical terms. In clinical coding systems, the terms are expressed in formal language which may not be a good match for the informal and/or shorthand language that may typically be used in clinical practice.

BRIEF DESCRIPTION OF THE DRAWINGS

Embodiments are now described, by way of non-limiting example, and are illustrated in the following figures, in which:

FIG. 8 illustrates an example of ranked results for a search by keyword;

FIG. 9 illustrates an example of ranked results for a search by code;

DETAILED DESCRIPTION

Certain embodiments provide an apparatus for medical text processing comprising processing circuitry configured to: obtain a trained model, wherein the trained model is trained to classify medical text documents with a medical classification code; apply the trained model to at least one medical text document to obtain weightings for text terms included in the at least one medical text document, wherein the weightings are associated with the medical classification code; and use the weightings to perform a searching or indexing process.

Certain embodiments provide an apparatus for medical text processing comprising processing circuitry configured to: obtain a list of keywords associated with the medical classification code, wherein the list of keywords has been obtained by applying a trained model to at least one medical text document to obtain weightings for text terms included in the at least one medical text document, wherein the trained model is trained to classify medical text documents with a medical classification code, and wherein the weightings are associated with the medical classification code; and perform a searching process comprising: receiving at least one further medical text document for search; receiving a query term for search; specifying that the medical classification code is associated with the query term; and finding a text portion in the at least one further medical text document, the text portion comprising a keyword of the list of keywords, wherein the keyword is not identical to the query term.

Certain embodiments provide a method comprising: obtaining a trained model, wherein the trained model is trained to classify medical text documents with a medical classification code; applying the trained model to at least one medical text document to obtain weightings for text terms included in the at least one medical text document, wherein the weightings are associated with the medical classification code; and using the weightings to perform a searching or indexing process.

Figure 1:
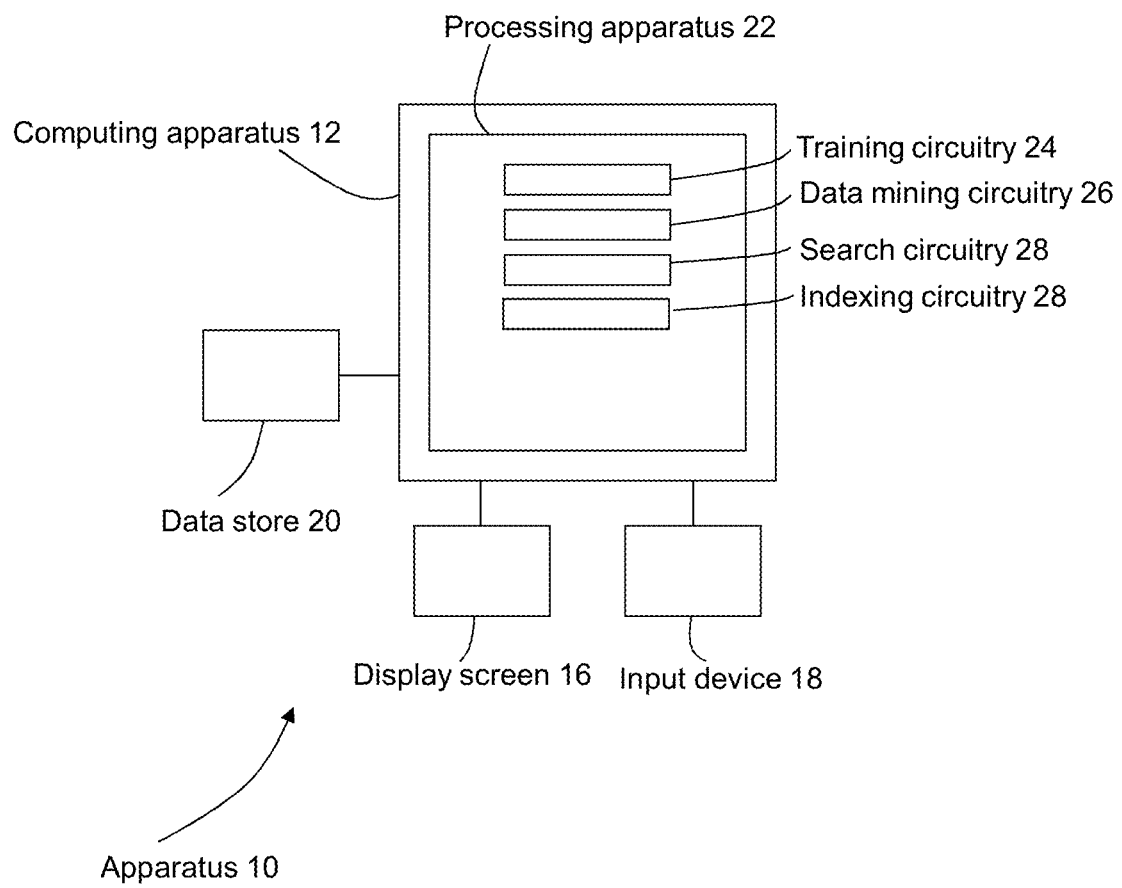
FIG. 1 is a schematic illustration of an apparatus in accordance with an embodiment.

An apparatus 10 according to an embodiment is illustrated schematically in FIG. 1. In the present embodiment, the apparatus 10 is configured to process medical text. The medical text may comprise, for example, clinical notes. In other embodiments, the apparatus 10 may be configured to process any appropriate text, which may not be medical.

The apparatus 10 comprises a computing apparatus 12, which in this case is a personal computer (PC) or workstation. The computing apparatus 12 is connected to a display screen 16 or other display device, and an input device or devices 18, such as a computer keyboard and mouse.

The computing apparatus 12 receives medical text from a data store 20. In alternative embodiments, computing apparatus 12 receives medical text from one or more further data stores (not shown) instead of or in addition to data store 20. For example, the computing apparatus 12 may receive medical text from one or more remote data stores (not shown) which may form part of an Electronic Medical Records system or Picture Archiving and Communication System (PACS).

Computing apparatus 12 provides a processing resource for automatically or semi-automatically processing medical text data. Computing apparatus 12 comprises a processing apparatus 22. The processing apparatus 22 comprises training circuitry 24 which is configured to train a machine learning model to classify documents with clinical codes; data mining circuitry 26 which is configured to mine documents for relevant terms; search circuitry 28 which is configured to search documents; and indexing circuitry 29 which is configured to index documents.

In the present embodiment, the circuitries 24, 26, 28, 29 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
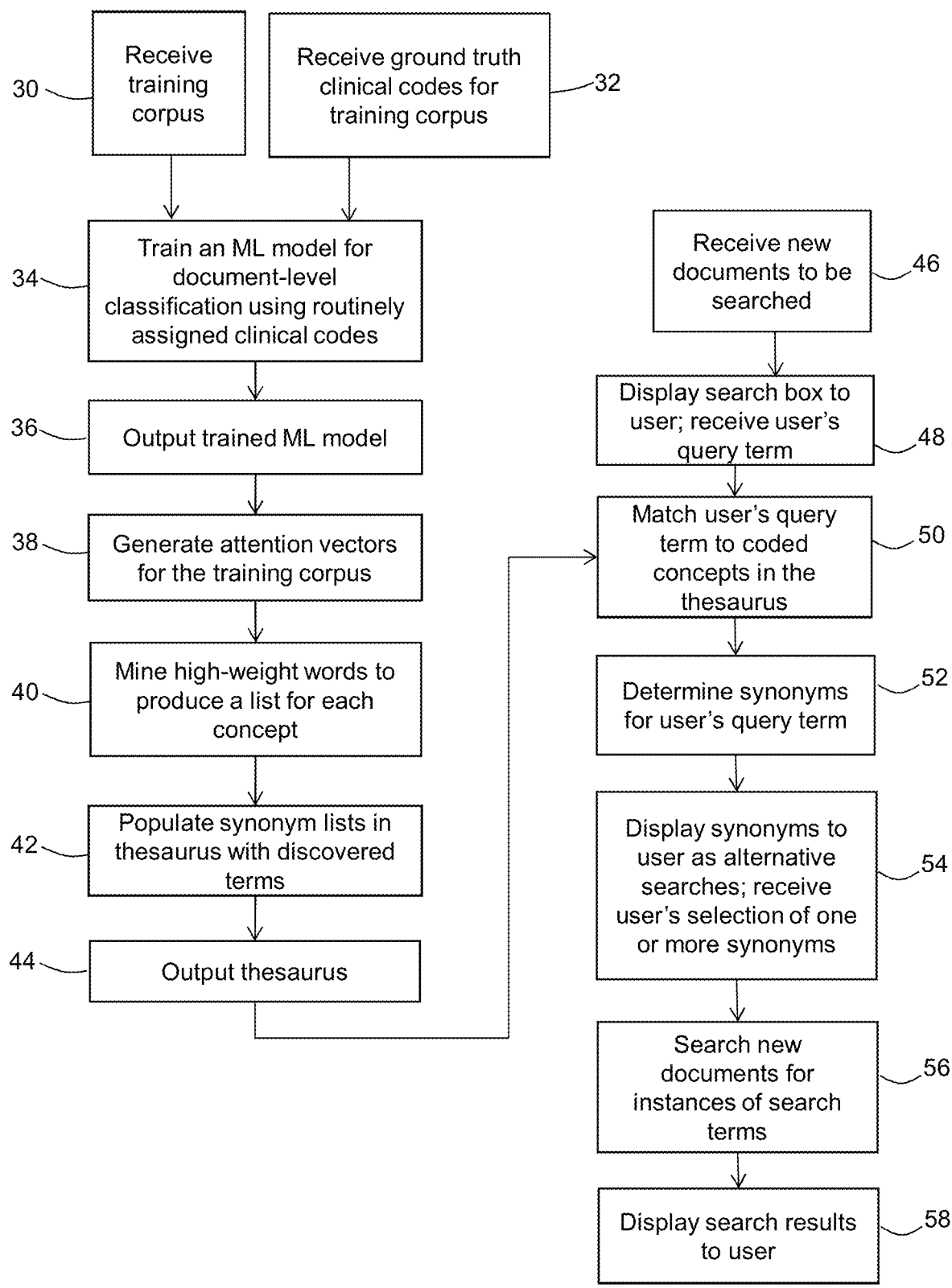
FIG. 2 is a flow chart illustrating in overview a method of an embodiment.

FIG. 2 is a flow chart illustrating in overview a method of an embodiment. The apparatus of FIG. 1 is configured to perform the method of FIG. 2. The method of FIG. 1 comprises a model training phase, a thesaurus creation phase, and a search phase. In the embodiment of FIG. 2, all of the model training phase, the thesaurus creation phase, and the search phase are performed by the apparatus 10 of FIG. 1. In other embodiments, different phases may be performed by different apparatuses. In some embodiments, a single phase may be divided between multiple apparatuses. Any suitable apparatus or apparatuses may be used.

The model training phase of the method of FIG. 2 comprises stages 30 to 36. At stage 30, the training circuitry 24 receives a training corpus from the data store 20. In other embodiments, the training circuitry 24 may receive the training corpus from any suitable data store or from another apparatus.

The training corpus comprises a plurality of training documents. In the present embodiment, each training document comprises a respective entry in an Electronic Medical Record system. The training documents may relate to a large number of patients, for example to all patients treated at a given hospital or other institution.

The training documents have previously been classified using a predetermined set of clinical codes in accordance with an existing clinical coding system. In the present embodiment, the clinical coding system is ICD-10 (the 10th revision of the International Statistical Classification of Diseases and Related Health Problems). In other embodiments, the clinical coding system may be any suitable clinical coding system, for example SNOMED CT (Systematized Nomenclature of Medicine—Clinical Terms), OCPS-4 (OPCS Classification of Interventions and Procedures version 4) or SMR (Scottish Morbidity Records). In some embodiments, clinical codes from multiple clinical coding systems may be used. The set of clinical codes comprise clinical codes that may be routinely assigned in clinical practice.

The clinical codes may also be referred to as medical classification codes. Each of the codes represents a respective clinical concept. For example, ICD-10 clinical code 99.10 is used to indicate the concept of injection or infusion of a thrombolytic agent. ICD-10 clinical code 305.1 is used to indicate the concept of tobacco use disorder.

In some embodiments, the medical classification codes used may comprise any suitable labels relating to, for example, a treatment or disease. For example, a medical classification code may relate to an order such as a prescription or an order for radiation therapy. A medical classification code may relate to a disease term which may be described by a physician, for example a disease location, a disease stage, or a TMN classification for a cancer.

The classification of the documents with clinical codes has been performed in accordance with the content of each of the documents. For example, documents relating to injection or infusion of thrombolytic agent are classified with the corresponding ICD-10 code for injection or infusion of thrombolytic agent, which is 99.10. Documents relating to tobacco use disorder are classified with the corresponding ICD-10 code for tobacco use disorder, which is 305.1. A document may be considered to relate to a given clinical code if it includes information regarding the concept that is represented by the clinical code. For example, a document may be classified with ICD-10 code 305.1 if it includes the information that the patient is a smoker.

Different documents in the training corpus are classified with different clinical codes. For example, a first subset of documents in the training corpus are classified with ICD-10 code 99.10. A second subset of documents, which may partially overlap the first subset, are classified with ICD-10 code 305.1. Many more other clinical codes may also be used to classify documents of the training classification.

In the present embodiment, the classification of the documents in the training corpus has been performed manually by an expert or experts. In other embodiments, any suitable classification method may have been used.

At stage 32, the training circuitry 24 receives a set of ground truth data comprising the clinical codes with which each of the training documents of the training corpus have been classified by the expert or experts. Each of the training documents is associated with respective ground truth data. The ground truth data for a given document may comprise one or more of the predetermined set of clinical codes. In some embodiments, the ground truth data is included in the training corpus, so the ground truth data and training corpus are received in a single step.

At stage 34, the training circuitry 24 uses the training corpus of stage 30 and the ground truth data of stage 32 to train a machine learning model to perform document-level classification using the predetermined set of clinical codes. In the present embodiment, the machine learning model is a multi-task model which is to be trained to classify documents with a plurality of different clinical codes of the predetermined set of clinical codes.

In other embodiments, a plurality of machine learning models are trained by the training circuitry 24. Each machine learning model is trained to classify documents with a respective clinical code or group of clinical codes.

In training, documents of the training corpus are input to the machine learning model. Outputs of the machine learning model are compared to the ground truth data. Errors in the output of the machine learning model are fed back to the machine learning model.

Any suitable training method may be used to train the machine learning model to classify documents with clinical codes. For example, a training method is described in Mullenbach, J., Wiegreffe, S., Duke, J., Sun, J. and Eisenstein, J., 2018, June. Explainable Prediction of Medical Codes from Clinical Text. In Proceedings of the 2018 Conference of the North American Chapter of the Association for Computational Linguistics: Human Language Technologies, Volume 1 (Long Papers) (pp. 1101-1111). In the present embodiments, the machine learning model is a neural network model, for example a convolutional neural network. A free text document is input to the neural network model. The neural network model generates a feature representation of each text term in the free text document. A text term may be, for example, a single word, a group of words, or a part of a word. The feature representations of the text terms are each multiplied by a respective attention contribution to provide a classification output. The classification output of the neural network model comprises probabilities of each of the predetermined set of ICD-10 codes. The probabilities may be thresholded to determine which of the ICD-10 codes are to be used to classify the input document.

In the present embodiment, the neural network model also outputs a respective attention vector for each of the ICD-10 codes that is assigned to each document. The attention vectors are derived from the attention contributions that are generated by the neural network model. Attention vectors are described further below with reference to stage 38.

In other embodiments, the machine learning model may not be a neural network model. The machine learning model may comprise any artificial intelligence or machine learning model with an attention model that uses free text as the input and clinical codes as the target to predict.

At stage 36, the training circuitry 24 outputs the trained machine learning model. The trained machine learning model is trained to perform document-level classification using clinical codes of the predetermined set of clinical codes. In the present embodiment, the clinical codes are ICD-10 codes. In other embodiments, the trained machine learning model may be trained to perform document-level classification using any suitable clinical codes.

The data mining circuitry 26 receives the trained machine learning model from the training circuitry 24. The indexing circuitry 29 may also receive the trained machine learning model from the training circuitry 24. Use of the indexing circuitry 29 is described below with reference to FIG. 10.

In the present embodiment, all of the model training phase, the thesaurus creation phase and the search phase are performed by the apparatus 10. In other embodiments, the model training phase of stages 30 to 36 is not performed by the apparatus 10. In such embodiments, the data mining circuitry 28 may receive the trained machine learning model from data store 20 or from another data store. The data mining circuitry 28 may also receive the training corpus from data store 20 or from another data store.

After stage 36, the flow chart proceeds to a thesaurus creation phase. The thesaurus creation phase comprises stages 38 to 44 of the flow chart.

At stage 38, the data mining circuitry 26 applies the trained machine learning model to each of the training documents of the training corpus to obtain a plurality of attention vectors.

Each of the training documents is a free text document. An example of a training document may be a discharge summary which a physician has input to the Electronic Medical Record system on discharging a patient from hospital.

For each of the training documents, data mining circuitry 26 inputs the document into the trained machine learning model. The trained machine learning model outputs a respective attention vector for each clinical code with which the training document is classified.

Consider, for example, a case in which the training document is classified with a first clinical code, for example ICD-10 code 99.10 which corresponds to the concept of injection or infusion of a thrombolytic agent.

In the process of classifying a document with the first clinical code, the trained machine learning model determines an attention contribution for each of the text terms (for example, each of the words) in the document. The attention contribution for a given text term indicates how important that text term was to the classifying of the document with the first clinical code. In the case of a text term that occurs multiple times within the document, each instance of the text term is considered separately. The machine learning model may learn to consider the context of the text term. Therefore, different instances of the text term may have different attention contributions.

The attention vector that is output by the machine learning model for the first clinical code is a vector having as many elements as the number of text terms in the document. For example, the text terms may be words, groups of words, or parts of words. Each element of the attention vector comprises an attention weighting for the corresponding text term of the document. The attention weightings are derived from the attention contributions. In the present embodiment, the attention weightings are obtained by normalizing the attention contributions such that the total of the attention weightings in the attention vector is 1.

The attention weighting for a text term may be considered to be reflective of an importance of the text term to the classification with the first clinical code. In some embodiments, the attention weighting may be used as an importance score. For example, the attention weighting may be considered to provide a word-level importance score. In other embodiments, a different importance score may be used, as described below.

Some text terms of the document have an attention weighting of zero. Text terms having an attention weighting of zero are text terms that did not contribute to the classification of the document with the first clinical code. Text terms having a non-zero attention weighting did contribute to the classification of the document with the first clinical code. The size of the attention weighting is greater for text terms that were more important to the classification.

Consider the example text:

"Acute cerebrovascular accident: The patient was not a candidate for tissue plasminogen activator. A neurology consult was obtained from Dr. X."

An attention vector is obtained for a document comprising the above text. The attention vector relates to the classifying of the document with ICD-10 code 99.10. The attention vector comprises a non-zero attention weighting for each word in the sequence 'for tissue plasminogen activator A neurology'. The other words of the example text have attention weightings of zero in the attention vector. Of the non-zero attention weightings, 'activator' has the highest attention weighting, 'plasminogen' has the second highest attention weighting, and 'tissue' has the third highest attention weighting. In determining attention weightings, the neural network takes account of the context of each word and not just the word itself.

Consider an attention vector for a second, different clinical code. For example, the second clinical code may be ICD-10 code 305.1 which corresponds to the concept of tobacco use disorder. An attention vector for the first clinical code and an attention vector for the second clinical code are obtained for the same document, if the document is classified with both the first clinical code and the second clinical code. The attention vector for the second clinical code has the same length as the attention vector for the first clinical code, if the attention vectors relate to the same document. In each case, the length of the attention vector is the number of text terms in the document, for example the number of words in the document. A respective attention weighting is provided for each text term in the document, for example each word in the document.

Different words are important for the classifying of the document with the first clinical code than for the classifying of the document with the second clinical code. The attention vector for the second clinical code is different from the attention vector for the first clinical code.

Consider another example text:

'social history patient smokes pack day name ni current tobacco smoker heavy has been smoking at this level for many years social history currently smokes cigarettes per day'

An attention vector is obtained for a document comprising the above text. The attention vector relates to the classifying of the document with ICD-10 code 305.1. The attention vector comprises non-zero attention weightings for each of the words in the sequences 'history patient smokes pack day', 'ni current tobacco smoker heavy', 'smoking', 'history currently smokes cigarettes per'. Other words in the example text have attention weightings of zero. The word given the highest attention weighting is for the first instance of 'smokes'. The second highest attention weighting is for 'tobacco'. The third highest attention weighting is for 'smoker', 'smoking', the second instance of 'smokes', and 'cigarettes'. The fourth highest attention weighting is for 'pack'.

The data mining circuitry 26 obtains attention vectors for all of the training documents. For each training document, the data mining circuitry 26 obtains a respective attention vector for each clinical code with which the training document is classified. The attention vectors may be referred to as code-specific or label-specific attention vectors.

For each clinical code, the data mining circuitry 26 obtains a respective plurality of attention vectors. The plurality of attention vectors relate to the subset of the training documents that were classified with that clinical code.

At stage 40, the data mining circuitry 26 mines the attention vectors for each clinical code. The data mining circuitry 26 mines the attention vectors for keywords relating to each of the clinical codes. Keywords may include individual words, groups of words, parts of words, or abbreviations.

For each clinical code in the predetermined set of clinical codes, keywords associated with the clinical code are mined from the training documents by selecting those text terms in the training documents that have an attention weighting that is greater than a given threshold value.

In the present embodiment, a threshold value is selected by a user. The threshold value may be written as $c_k$. The data mining circuitry 26 adjusts the user-selected threshold value to adjust for the document length d.

$$\text{Threshold}_k(d) = c_k \frac{1}{d}$$

$\text{Threshold}_k(d)$ is the threshold value after adjustment is made to take into account the document length d.

The threshold value is adjusted to take account of the document length d because the attention weightings for all of the words in a given document are normalized to sum to 1. Individual attention weightings may be expected to be lower in a long document, and higher in a short document. Adjusting the threshold value by the document length may allow for a fair comparison across documents.

The data mining circuitry 26 applies the adjusted threshold value to each attention vector for a clinical code of interest. In the present embodiment, the data mining circuitry 26 uses the same user-selected threshold value for each of the clinical codes in the predetermined set of clinical codes. In other embodiments, different threshold values may be used for different clinical codes.

The data mining circuitry 26 identifies each text term that has an attention weighting that is above the adjusted threshold value for the document in which the term occurs. The data mining circuitry 26 aggregates the terms that have been identified for each clinical code.

In the present embodiment, the data mining circuitry 26 considers each identified term to be a keyword. In other embodiments, data mining circuitry 26 may apply further criteria.

In the present embodiment, the data mining circuitry 26 produces an ordered list of keywords for each clinical code of the set of predetermined clinical code. The ordered list comprises all text terms that were identified as exceeding the adjusted threshold value for the document in which they occurred. The list is ordered by the frequency with which each keyword was identified in the training vectors for the clinical code. In other embodiments, the data mining circuitry 26 may produce a list of keywords that is not ordered.

Consider, for example, the attention vectors obtained for ICD-10 code 250.00, which corresponds to the concept of diabetes mellitus without mention of complications.

In an embodiment, the data mining circuitry 26 outputs a list of the top N words or phrases ordered by frequency in training data attention vectors for ICD-10 code 250.00. N is a number, which may be selected by a user. In the example given below, N is 18.

An example of the list obtained is as follows:
insulin 1249
diabetes 1043
dm 803
diabetes mellitus 592
atorvastatin 394
dm2 339
metformin 310
diabetic 263
protonix 259
diabetes mellitus type 254
sugars 238
glyburide 230
simvastatin 223
etoh 213
type 2 diabetes 203
type 2 diabetes mellitus 124
dmii 124
hyperglycemia 114

Each text term in the list above is accompanied by a number of instances of that text term for which the attention weighting exceeded the adjusted threshold value.

In the embodiment of FIG. 2, a respective list of keywords is obtained for each of the clinical codes in the predetermined set of clinical codes. Each list of keywords comprises text terms identified by applying the adjusted threshold value. Each list of keywords is ordered by a number of instances of each word that exceeded the adjusted threshold value.

At stage 42, the data mining circuitry 26 uses the lists of keywords to create a thesaurus comprising codes representing a plurality of concepts, and a respective synonym list associated with each concept. The data mining circuitry 26 populates each synonym list with a plurality of terms.

Some of the terms in the synonym lists are taken from an existing knowledge base, for example from the ICD-10 clinical coding system itself. The ICD-10 clinical coding system includes synonyms for concepts in the clinical coding system. As described above, the synonyms present in the clinical coding system may primarily include formal, clinical terms and may not include less formal terms.

Others of the terms in the synonym lists are keywords that have been obtained at stage 40 by thresholding the attention vectors of stage 38. At least some of the keywords obtained at stage 40 may be less formal than those present in the ICD-10 clinical coding system. For example, the keywords obtained at stage 40 may include abbreviations and/or misspellings.

In some embodiments, rather than treating terms in the synonym lists independently, terms may be clustered into groups of synonyms. For example, clustering may be performed using first letter sequences for abbreviations. Clustering may be performed based on an edit distance between terms, for example a Levenshtein distance. An edit distance quantifies the number of operations that need to be made to transform a text string into another text string. A Levenshtein distance considers operations of deletion, insertion, or substitution. A determination of an edit distance may be used to find misspellings. Misspellings may then be grouped with the correctly-spelled term to which they are related.

Figure 3:
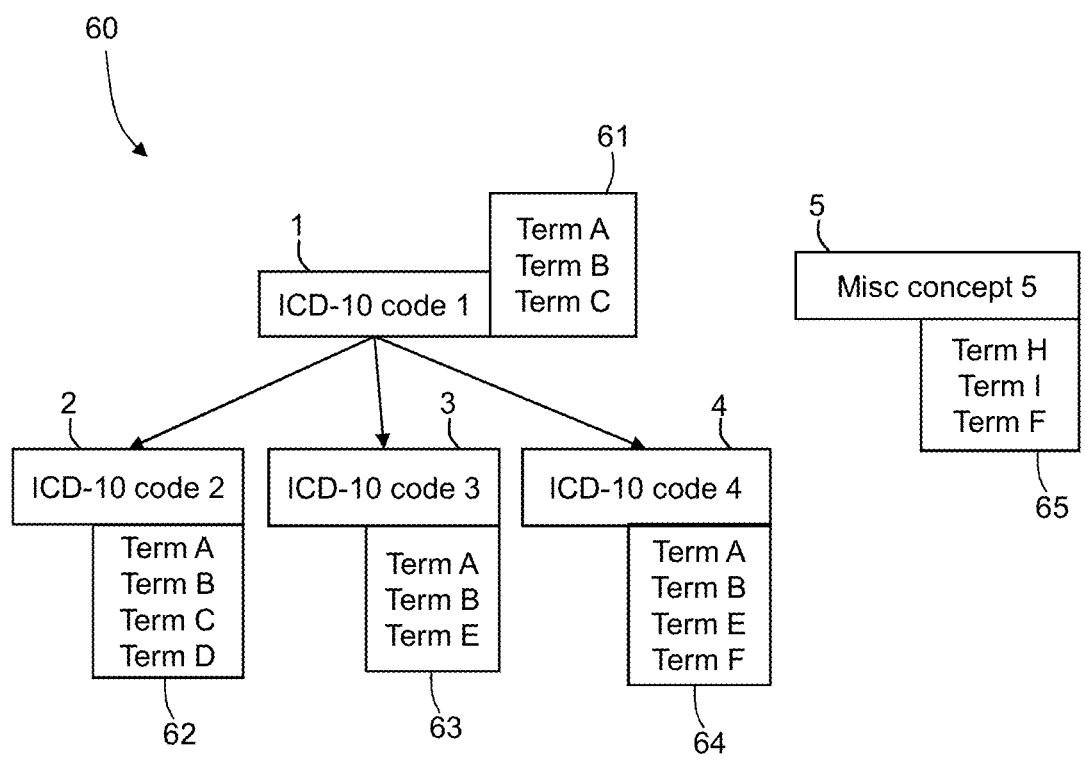
FIG. 3 is an illustration of a simplified example of a thesaurus in accordance with an embodiment.

FIG. 3 illustrates a simplified example of a thesaurus 60. The thesaurus 60 comprises a plurality of ICD-10 codes 1, 2, 3, 4. A relationship between ICD-10 codes 1, 2, 3, 4 is known from the ICD-10 clinical coding system. In the example shown in FIG. 3, ICD-10 code 1 relates to a first concept, and ICD-10 codes 2, 3, 4 relate to different sub-concepts of the concept of ICD-10 code 1.

The thesaurus of FIG. 3 also includes a miscellaneous concept 5 (Misc concept 5 in FIG. 3) which is not part of the ICD-10 clinical coding system. The miscellaneous concept 5 may be part of another clinical coding system. Alternatively, the miscellaneous concept 5 may be part of a set of local codes, for example codes that are local to a particular hospital or region.

For each of the concepts represented by codes 1, 2, 3, 4, 5 in the thesaurus 60, the thesaurus 60 includes a respective synonym list 61, 62, 63, 64, 65 associated with that concept.

ICD-10 code 1 has a synonym list 61 including Term A, Term B and Term C. ICD-10 code 2 has a synonym list 62 including Term A, Term B, Term C and Term D. ICD-10 code 3 has a synonym list 63 including Term A, Term B and Term E. ICD-10 code 4 has a synonym list 64 including Term A, Term B, Term E and Term F. Miscellaneous concept 5 has a synonym list 65 including Term H, Term I and Term F.

Some of the terms in the synonym lists are obtained from the ICD-10 clinical coding system. Others of the terms in the synonym list are obtained by data mining as described above. The terms obtained by data mining may be referred to as discovered terms.

At stage 44, the data mining circuitry 26 outputs the thesaurus that was created at stage 60. The thesaurus comprises a respective synonym list for each of the clinical codes in the predetermined set of clinical codes. In the present embodiment, the data mining circuitry 26 passes the thesaurus to the search circuitry 28.

After the thesaurus creation phase of stages 38 to 44, the method proceeds to the search phase, which includes stages 46 to 58. The search phase may also be referred to as a deployment phase.

At stage 46, the search circuitry 44 receives target text documents to be searched. The target text documents are documents that were not included in the training corpus. The target text documents may comprise all text documents that are related to a particular patient, for example all the text documents that are stored for that patient in an Electronic Medical Record system. The target text documents may be received from the data store 20 or from any other suitable data store. In some embodiments, the target text documents may be selected by a user. In some embodiments, a patient may be selected by the user, and the search circuitry 28 may select all text documents associated with that patient.

At stage 48, the search circuitry 28 displays a search box to a user on the display screen 16. The user enters a query term into the search box. The query term is a term that the user wishes to use in a search of the target text documents. For example, the user may input the query term 'Blood pressure' with an aim of finding any references to blood pressure that exist within the target text documents.

At stage 50, the search circuitry 28 matches the query term to at least one of the coded concepts included in the thesaurus. Some of the coded concepts in the thesaurus have ICD-10 clinical codes. Others of the coded concepts in the thesaurus may not have ICD-10 codes. Each concept included in the thesaurus has an associated synonym list. The search circuitry 28 matches the query term to at least one of the coded concepts by identifying any concept for which the query term is part of the synonym list.

Turning again to the example thesaurus 60 of FIG. 3, consider the case in which the user types Term F into the search box. The search circuitry 28 matches the user's query term to the concepts for which Term F is included in the synonym list. The search circuitry 28 identifies ICD-10 code 4 because Term F is included in the synonym list 64 that is associated with Term F. The search circuitry 28 identifies miscellaneous concept 5 in thesaurus 60 because Term F is included in the synonym list 65 that is associated with Term F.

At stage 52, the search circuitry 28 determines a list of synonyms for the query term using the coded concepts identified at stage 50. The search circuitry 28 includes in the list of synonyms any term that is included in the synonym list for any of the identified concepts.

In other embodiments, the search circuitry 28 searches the synonym lists for the query term directly instead of first identifying the concepts with which the query term is associated. In such embodiments, the searching is still based on an association of synonyms with a given coded concept. In searching the synonym lists, the search circuitry 28 associates the query term and synonyms with the coded concept.

The search circuitry 28 finds instances of the query term within the thesaurus. The search circuitry 28 consults the synonym lists in which instances of the query term are present, and returns the synonyms from each of the synonym lists in which the query term is present.

The synonyms may also be referred to as sister terms. It is noted that some of the synonyms returned from the synonym lists may not have exactly the same meaning as each other. The terms in a synonym list are considered to be synonyms to each other because they are terms that relate to a common concept.

Turning again to the example of FIG. 3, if the query term is Term F, the search circuitry 28 has selected the concepts of ICD-10 code 4 and miscellaneous concept 5 at stage 50. At stage 52, the search circuitry 28 determines a list of synonyms for Term F which includes Term A, Term B and Term E from synonym list 64, and Term H and Term I from synonym list 65.

At stage 54, the search circuitry 28 displays the list of synonyms to the user on display screen 16. For example, if the query term is 'Blood pressure', the search circuitry 28 may display the synonyms 'BP', 'SBP, Diastolic' and 'Blood-pressure'. Each synonym of the list of synonyms is selectable by the user. In some embodiments, the user is given an option to select all synonyms.

By displaying the list of synonyms, the search circuitry 28 provides a list of alternative searches that are related to the user's query term.

The user selects which of the synonyms of the list of synonyms they would like to add to their search, along with the original query term. For example, the user may choose to search for 'Blood-pressure' and 'BP' in addition to 'Blood pressure'. The search circuitry 28 receives from the user a selection of one or more of the displayed synonyms.

In other embodiments, the search circuitry 28 automatically selects all of the synonyms on the list of synonyms that it has determined at stage 52. In some embodiments, the user is given the opportunity to deselect one or more synonyms of the list of synonyms.

At stage 56, the search circuitry 28 searches each of the target text documents for instances of the query term and for instances of the selected synonyms. The search circuitry 28 identifies which of the target text documents include at least one instance of the query term and/or at least one instance of a selected synonym. Within the identified text documents, the search circuitry 28 locates a text portion comprising the query term and/or synonym.

At stage 58, the search circuitry 28 displays to the user the target text documents that were identified at stage 56. The target text documents are displayed on display screen 16. The search circuitry 28 may display each target text documents such that the text portion comprising the query term and/or synonym is on display. For example, the search circuitry 28 may scroll the document to the appropriate text portion. The search circuitry 28 may highlight instances of the query term and of selected synonyms.

The user may navigate to any of the displayed text documents using the display screen 16.

Turning again to the example of FIG. 3 in which the user has selected Term F, the search circuitry 28 displays to the user at stage 54 a list of synonyms comprising Term A, Term B, Term E, Term H and Term I. The user may select one or more synonyms from the list of synonyms. For example, the user may select Term A and Term H. At stage 56, the search circuitry 28 searches the target text documents for instances of Term F, Term A and Term H. The search circuitry 28 displays to the user any of the target text documents that includes Term F, Term A and/or Term H. The search circuitry 28 highlights the instances of Term F, Term A and Term H within the displayed target text documents.

The search circuitry 28 may be considered to provide a smart search engine that considers not only the query term that was input by the user, but also synonyms for the query term. The method of FIG. 2 may allow easy navigation of ontologies by augmenting a clinical coding system's native list of synonyms with natural language terms that may occur in common use. The synonyms found using the method of FIG. 2 may include common misspellings, abbreviations and/or brand names. For instance, 'smoker' or 'ppd' may be found to be more intuitive and/or convenient search terms than 'tobacco use disorder'.

Machine learning may be seamlessly integrated with existing knowledge bases, for example existing clinical coding systems. Improved search may be provided. In some circumstances, the search may be more comprehensive than a text search for a query term alone. The search may also be more comprehensive than a text search for synonyms that are included within a clinical coding system, since it may include more informal terms.

One or more clinical coding systems may be leveraged as the backbone of a search system. The search system uses the attention mechanism in a trained model (for example, a CNN model) that is trained to predict clinical codes. The search system uses the attention mechanism to data mine concept-related search terms from clinical text and use the data mined terms to augment the synonym lists in the chosen one or more clinical coding systems. An automated thesaurus is created from the one or more coding systems and the data mined terms.

In the embodiment of FIG. 2, a GPU is used for training the machine learning model and for creating the thesaurus. However, no GPU is required when the thesaurus is deployed. Once the thesaurus has been created, it may be deployed without deployment of the trained machine learning model. The deployment of the thesaurus may require less computational resources than the deployment of the machine learning model itself.

In the embodiment described above with reference to FIG. 2, the search circuitry 28 generates a list of synonyms for each concept. When the user enters a query term, the search circuitry 28 finds concepts to which the query term is related, finds synonym lists for the concepts, and uses the synonym lists to display a list of synonyms for the query terms.

In other embodiments, the search circuitry 28 may also display to the user the concepts that were identified as being related to the query term. The user may choose to search for documents relating to one or more of the displayed concepts, for example documents that have been classified with one or more of the displayed concepts.

Turning again to the example of FIG. 3 in which Term F is used as the query term, the search circuitry 28 may suggest to the user the concepts of ICD-10 code 4 and miscellaneous concept 5. The user may choose to search for documents that are classified with ICD-10 code 4. The user may choose to search for documents that include ICD-10 code 4. The user may choose to search for documents that are classified with miscellaneous concept. The user may choose to search for documents that include miscellaneous concept 5.

In a further deployment of thesaurus 60 of FIG. 3, the user types Term C into the search box. The search circuitry 28 identifies ICD-10 code 1 and ICD-10 code 2, since Term C occurs in synonym list 61 for ICD-10 code 1 and in synonym list 62 for ICD-10 code 2. The search circuitry 28 makes a list of synonyms for Term C, which includes Term A and Term B from synonym lists 61 and 62, and Term D from synonym list 62. The search circuitry 28 displays the list of synonyms to the user. The user may select one or more of Term A, Term B and Term D for search. The search circuitry 28 may also display to the user the identified concepts, which are ICD-10 code 1 and ICD-10 code 2. The user may select ICD-10 code 1 and/or ICD-10 code 2 for search.

In some embodiments, the user may enter more than one query term in the search box. In one example using the thesaurus 60 of FIG. 3, the user enters Term A+Term C in the search box. The search circuitry 28 identifies any concept in thesaurus 60 that has both Term A and Term C in its synonym list. The search circuitry 28 identified ICD-10 code 1 and ICD-10 code 2. The search circuitry 28 then identifies other terms that are in the synonym lists 61 and 62 for ICD-10 code 1 and ICD-10 code 2. The search circuitry identifies Term B and Term D and displays them to the user. The user may select Term B and/or Term D for search. The search circuitry 28 may also display ICD-code 1 and ICD-10 code 2 to the user. The user may select ICD-10 code 1 and/or ICD-10 code 2 for search.

In some embodiments, the search circuitry 28 offers the user the opportunity to navigate a tree structure of related concepts. For example, in response to a user selection of ICD-10 code 2 or a user selection of a keyword associated with ICD-10 code 2, the search circuitry 28 may display to the user the tree structure that comprises ICD-10 code 1, ICD-10 code 2, ICD-10 code 3 and ICD-code 4. The user may choose to select any of ICD-10 code 1, ICD-10 code 3 or ICD-code 4, which are conceptually related to ICD-10 code 2.

In the embodiment of FIG. 2, the search circuitry 28 finds synonyms for the query term. The search circuitry 28 displays the synonyms to the user. Once the user has selected one or more of the synonyms, the search circuitry 28 searches the target text documents for the query term and for the selected one or more synonyms.

In other embodiments, the search circuitry 28 searches the target text documents for the query term and/or for the synonyms before displaying a list of synonyms for the query term to the user. In some such embodiments, the search circuitry 28 determines how many of the target text documents include each of the synonyms. The displayed list of synonyms includes, for each synonym, the number of target text documents that include that synonym. In other embodiments, the search circuitry 28 may determine and display a number of instances of each synonym occurring within the target text documents. The number of instances may be higher than the number of documents if the same query term occurs more than once within a single document.

In some embodiments, the search circuitry 28 selects which synonyms to display based on the number of the target text documents in which the synonym appears, or the number of instances of the synonym within the target text documents. In some embodiments, the search circuitry 28 orders the displayed synonyms based on the number of the target text documents in which the synonym appears, or the number of instances of the synonym within the target text documents.

Figure 4:
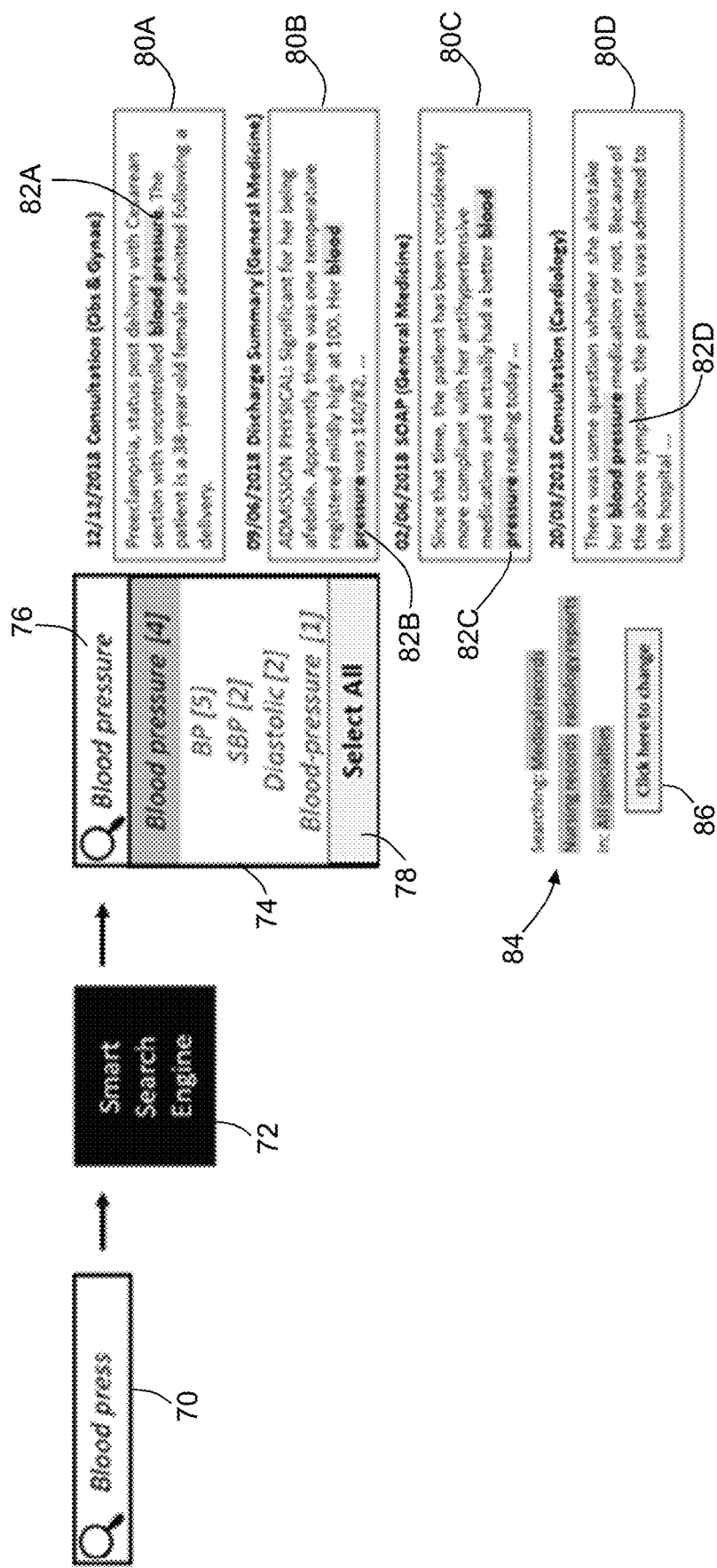
FIG. 4 is a flow chart illustrating in overview a method of an embodiment.

FIG. 4 is a further flow chart relating to the user's experience. In the embodiment of FIG. 4, the user is a clinician. In other embodiments, the user may be any suitable user, for example any suitable medical professional or researcher.

The search circuitry displays a search box 70. The clinician types a search term in the search box 70. The search term may also be referred to as a query term. In FIG. 4, the clinical types in 'blood press'. The step of displaying a search box and receiving user input may be as described above with reference to stage 48 of FIG. 2.

The search circuitry 28 inputs the query term to a smart search engine 72. In the embodiment of FIG. 4, the smart search engine 72 is implemented in the search circuitry 28. The smart search engine 72 applies an algorithm to generate related terms for the query term and performs a search. The algorithm performs steps similar to those described above with reference to stages 50 and 52. The smart search engine 72 obtains a list of synonyms for the query term. The synonyms may also be described as further selected search terms or additional search terms.

In the embodiment of FIG. 4, the smart search engine 72 also searches the target text documents for instances of the query term and of the synonyms. The smart search engine 72 returns a number of target text documents that contain the query term and a respective number of target text documents that contains each of the list of synonyms.

In the embodiment of FIG. 4, the query term is not included in the thesaurus, so the smart search engine 72 searches the thesaurus for the term in the thesaurus that is most similar to the query term. For example, the smart search engine 72 may determine similarity using edit distance. In the case of the query term 'blood press', the closest term in the thesaurus is 'blood pressure'.

The smart search engine 72 outputs a list 74 that includes the determined closest term and the list of synonyms. The list 74 comprises the determined numbers of target text documents for the determined closest terms and for each of the list of synonyms. The smart search engine 72 updates the search box to show the determined closest term 76.

The search circuitry 28 displays the list 74 to the user. In FIG. 4, the list 74 includes:
Blood pressure [4]
BP [5]
SBP [2]
Diastolic [2]
Blood-pressure [1]

Numbers in square brackets are used to represent a number of target text documents that contain each of the terms on list 74. In other embodiments, the list may display a number of instances of the terms in each of the target text documents, or in the set of target text documents as a whole.

The search circuitry 28 displays a display element 78 having the text 'Select All'. The clinician may select the determined closest term or any of the list of synonyms by selecting an appropriate entry on the list 74, for example by clicking on the entry. The clinician may select all entries on the list 74 by selecting element 78, for example by clicking element 78.

In FIG. 4, the determined closest term 'Blood pressure' has been selected. The search circuitry 28 displays all of the target text documents that include the term 'Blood pressure'. In FIG. 4, four target text documents 80A, 80B, 800, 80D are displayed.

The search circuitry 28 uses a highlighted region 82A to highlight an instance of the term 'blood pressure' in target text document 80A. The search circuitry 28 uses a highlighted region 82B to highlight an instance of the term 'blood pressure' in target text document 80B. The search circuitry 28 uses a highlighted region 82C to highlight an instance of the term 'blood pressure' in target text document 80C. The search circuitry 28 uses a highlighted region 82D to highlight an instance of the term 'blood pressure' in target text document 80D.

In the embodiment of FIG. 4, the display presented to the user further includes a list 84 of target document types that are to be searched. The list comprises Medical records, Nursing records, Radiology reports, All specialities. In FIG. 4, all of the terms in list 84 are highlighted to indicate that target documents from all target document types are being searched. A display element 86 is displayed, the display element 86 having the text 'Click here to change'. The user may click on the display element 86 to change the target document types being searched. For example, the user may deselect one or more of the target document types. The user may select only a single target document type, for example Nursing records, or multiple document types. If the user changes the target document types, the search circuitry 28 updates the list 74 to include only terms that are present in the selected target document types. The search circuitry 28 updates the list 84 to show the user's new selection. For example, the search circuitry 28 may highlight in list 84 only the target document types for which search results are currently displayed.

Figure 5:
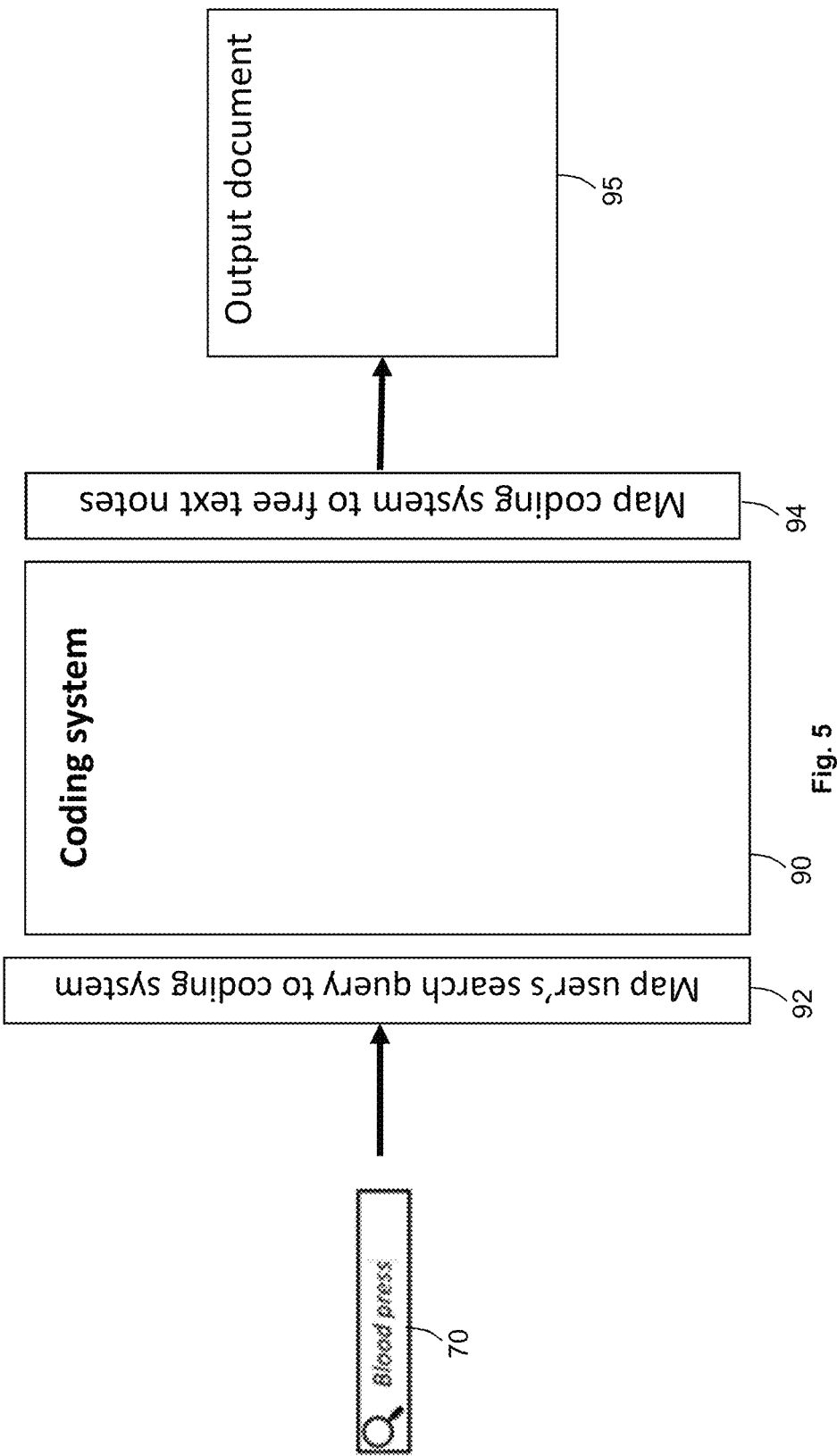
FIG. 5 is a schematic representation of a smart search engine in accordance with an embodiment.

FIG. 5 is an alternative representation of the smart search engine 72. The user types one or more query terms into search box 70. The smart search engine 72 comprises three components 90, 92, 94. Component 90 is a clinical coding system, for example a known clinical coding system that has been extended using a thesaurus. Component 92 maps the user's search query to the clinical coding system 90. Component 94 maps the coding, system to free text notes to locate relevant terms in a target text document. An output 95 is a version of the target text document in which relevant terms have been located. The output 95 is displayed to the user.

The smart search engine 72 provides an interface between natural language seen in clinical text and predetermined coding systems such as ICD-10, SNOMED CT or OPCS-4.

The methods describes above with reference to FIGS. 2 to 5 provide methods of data mining concept-related search terms from clinical text and using these to augment synonym lists in a chosen clinical coding system or systems. Data mining of terms is provided using the attention mechanism in a neural network that is trained for clinical code prediction. An automated thesaurus is created from the coding system and data-mined terms. Coded concepts may be linked with associated data-mined terms.

In embodiments described above with reference to FIGS. 2 to 5, a query term is input by the user. The search circuitry 28 uses the thesaurus to obtain synonyms for the query term. The user may be offered the list of synonyms and may select one or more of the synonyms for search. The methods of FIGS. 2 to 5 may be used to find all relevant matches in the text (for example, synonyms and related terms) for a user's search term query. If the search circuitry 28 can identify other terms that are relevant to an original term, then the user may search for matches to these terms also. A method of search query expansion may be provided by the methods of FIGS. 2 to 5. Search query expansion comprises expanding an original search term into a list of relevant search terms. Synonyms provided in clinical coding systems may be used for search query expansion. However, the synonyms provided in clinical coding systems may not be a good match for the informal or shorthand language used in clinical practice. By using the attention mechanism from a model that is trained to classify text using clinical codes, additional synonyms may be obtained, which may include informal or shorthand terms.

In some embodiments, a search query is expanded to include related clinical codes in addition to synonyms. In stage 50 of the method described above with reference to FIG. 2, a user's query term is matched to one or more coded concepts. In some embodiments, the coded concepts to which the query term is matched are displayed to the user. The user may select a coded concept in order to perform a search which delivers all target text documents that have been classified with that concept.

Figures 6, 7:
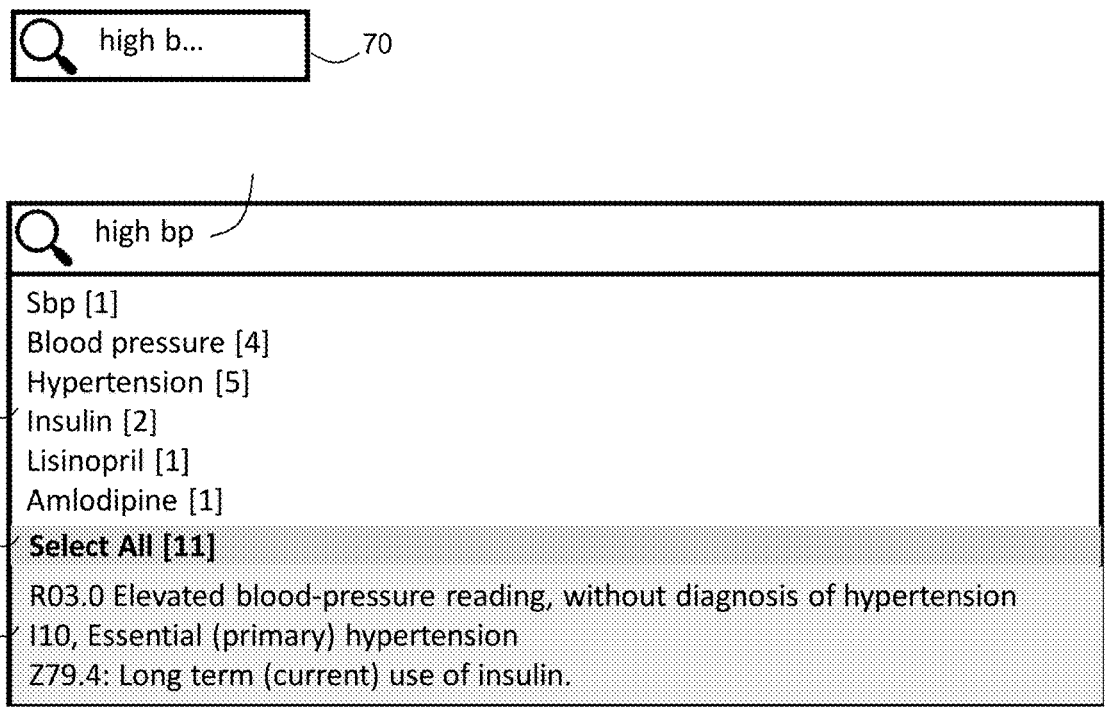
FIG. 6 shows an example of a user interface for search query expansion in accordance with an embodiment.
FIG. 7 illustrates an example of a synonym list with associated importance scores.

An examples of a user interface for search query expansion is shown in FIG. 6. A user types a query term into the search box 70. In the embodiment of FIG. 6, the query term is 'high b'.

The search circuitry 28 uses the thesaurus to suggest a list 74 of terms. The search circuitry 28 determines a most similar term 76 to the query term provided by the user, and displays the most similar term 76 to the user. In the embodiment of FIG. 6, the most similar term 76 is 'high bp'. In other embodiments, the step of determining a most similar term 76 is omitted and the query term is used for search.

The search circuitry 28 determines a list of synonyms 74 for the most similar term 76. The search circuitry 28 displays the list of synonyms 74 to the user for selection as search suggestions. In other embodiments, the query term 76 is part of the thesaurus, and the search circuitry 28 determines a list of synonyms for the query term 76.

In the embodiment of FIG. 6, the search circuitry 28 also displays the number of target text documents in which each of the terms may be found, which may be referred to as a number of hits found in the patient's medical system. In some embodiments, the synonyms are ranked by number of hits. For example, synonyms with a higher number of hits may be higher in the list 74 than synonyms with a lower number of hits. In other embodiments, more important search terms may be displayed first. A method of determining a relative importance of search terms is discussed below with reference to FIG. 7.

The user may choose to see results from the suggested search terms 74. The search circuitry 28 displays an option 78 for the user to select all of the synonyms. If the user chooses 'Select All' 78, hits relating to all suggested search terms are displayed.

In the embodiment of FIG. 6, the search circuitry 28 also displays a list of clinical codes 96 associated with the most similar term 76. The clinical codes are the codes that have been determined to be associated with the most similar term 76 at stage 50 of FIG. 2. In other embodiments, the clinical codes are clinical codes associated directly with the query term. The search circuitry 28 may display a closest match first.

The closest match may be referred to as a primary code.

In some embodiments, rather than searching on raw terms, the user may choose to select a suggested code from the list of clinical codes 96. The user may choose to select one of the suggested codes by directly typing the code number into the search box 70, or by clicking on the displayed code. The display of the clinical codes 96 may allow the user to search by concept. For example, a tree structure may be displayed, which may allow the user to navigate between related clinical codes. In some embodiments, coded concepts are displayed that do not form part of existing clinical coding systems. The user may navigate by such coded concepts.

In some embodiments, when the user selects a code, the search circuitry 28 displays all documents that are classified with that code. In some embodiments, when the user selects a code, the search circuitry 28 displays all terms that are associated with that code in the thesaurus. A number of target text documents including each term associated with the code may be displayed. One or more terms may be selected by the user. The user may navigate the coding system to find further hits.

In some embodiments, search results are assigned a ranking based on importance scores for each text term for each concept. The importance score for each text term may be derived from the frequency of that term in the attention vector, a mean attention weighting, or a related metric. FIG. 7 shows the synonym list 64 for ICD-10 code 4 as illustrated in FIG. 3. The synonyms list 64 is supplemented with a set of importance scores 98 for the text terms in the synonym list 64.

To obtain the importance scores of FIG. 7, a method is used that may be considered to comprise an adaptation of a classical term frequency-inverse document frequency (TF-IDF) metric. The method uses the attention vectors for the training corpus that were determined at stage 38 of the method of FIG. 2. N is the total number of documents in the training corpus.

For a text term associated with a concept c, a weight $W_{t,c}$ of term t for concept c is given by $$W_{t,c} = CF_{t,c} \log\left(\frac{N}{CF_t}\right)$$

$CF_{t,c}$ is the number of occurrences of term t for concept c in the attention vectors for the training corpus. In some circumstances, term t may occur in the attention vector associated with concept c in all of the subset of training documents that were classified with concept c by the trained machine learning model. In other circumstances, term t may occur in the attention vector associated with concept c in only some of the subset of training documents that were classified with concept c.

$CF_t$ is the number of concepts associated with the term t. Some terms are associated with a large number of concepts. By considering the number of concepts with which a given term t is associated, the importance score weights unusual words more highly than common words. In some circumstances, less common terms may distinguish better between concepts.

Using the above approach, importance scores are assigned to all terms t associated with a given concept c. For example, in the case of ICD-10 code 4, importance scores are associated with each of Term A, Term B, Term E and Term F.

Once importance scores are obtained for each of the terms, the terms may be ranked by importance score. For example, a list of synonyms 74 may be ordered such that terms with a higher importance score are nearer the top of the list. By normalizing importance scores, it may be possible to compare importance scores that have been obtained for different concepts.

In the method of FIG. 7, a ranking method is derived from the frequency of terms in attention vectors. The number of times in which a text term t occurs in attention vectors for concept c is used to determine the importance score.

In other embodiments, an importance score may be based on the attention weighting that a text term t is given in each attention vector. For example, a mean attention weighting for the text term t across all attention vectors may be determined. Terms with higher mean attention weighting are given a higher importance score, and so are ranked more highly.

In further embodiments, any suitable metric may be used to determine importance scores, and therefore rankings.

In deployment, matching to codes and ranking of results may leverage an importance score between each term and each concept, based on a mean attention weight and/or frequency observed in the training data. For example, results may be ordered in accordance with importance score.

FIG. 8 is an example of results returned from a search on the list of synonyms shown in FIG. 6. In this search, a ranking method is used which is different from that described above with reference to FIG. 7.

A user selects 'Search All'. A list of results is returned. In the example of FIG. 8, the original search term "high bp" would not have returned any hits in the document searched, but searching on synonyms returns some hits 200, 202, 204, 206, 208 which look relevant. The hits 200, 202, 204, 206, 208 are ranked in accordance with importance scores learned for text terms for the related concepts, starting with the original query term first (if present). The ranking is indicated by arrow 210.

In the example of FIG. 8, the first hit 200 on 'SBP' actually relates to spontaneous bacterial peritonitis and not systolic blood pressure. In the second hit 202, the blood pressure relates to the patient's family and not to the patient himself.

In order to use contextual cues, the user can instead search by concept. FIG. 9 shows an example of searching on a selected concept, for example R03.0 Elevated blood-pressure reading, without diagnosis of hypertension. FIG. 9 shows a list of results that are returned from the search by concept. The results returned are those instances indexed for the concept R03.0 Elevated blood-pressure reading, without diagnosis of hypertension. Results 204, 206 and 202 are returned. Arrow 212 represents an order of ranking. It is noted that result 202, having a mention of a family history of high blood pressure, still appears as a relevant result. However, it is now ranked lower down the list. Irrelevant hits and mentions of hypertension have been filtered out.

Figure 10:
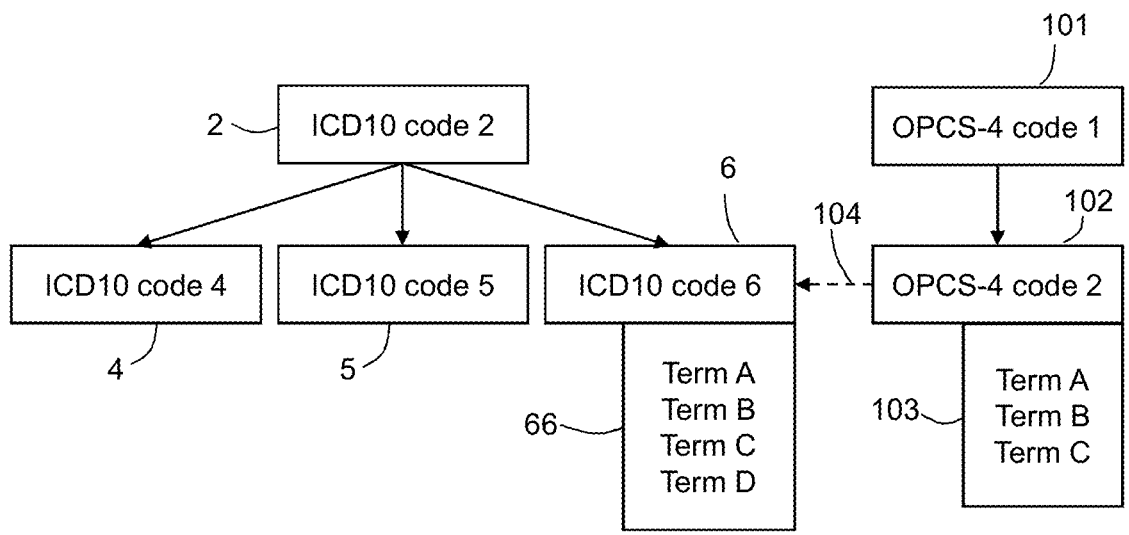
FIG. 10 is a schematic illustration of a connection formed between two clinical coding systems using a method of an embodiment.

FIG. 10 is a schematic illustration of a connection formed between two clinical coding systems using a method of an embodiment. Where the synonym lists for two clinical codes largely share terms, it may be likely that the clinical codes are related. For example, where the synonym lists for two clinical codes from different clinical coding systems largely share terms, it may be the case that the two clinical codes both represent the same concept. New connections may be formed within or between coding systems.

In some embodiments, the thesaurus circuitry 26 determines a possible connection between a first clinical code in a first clinical coding system and a second clinical code in a second clinical coding system. The possible connection is based on a number of synonyms that are shared between the synonym list for the first clinical code and the synonym list for the second clinical code.

The determining of the possible connection may be based on the importance scores associated with each term in the synonym lists. Terms having higher importance scores may be given greater consideration when determining a possible connection.

FIG. 10 shows ICD-10 codes 2 and 4 as shown in FIG. 3. FIG. 10 also shows ICD-10 codes 5 and 6. ICD-10 code 6 has a synonym list 66 comprising Term A, Term B, Term C and Term D.

The concepts of ICD-codes 4, 5 and 6 are sub-concepts of the concept of ICD-10 code 2, as indicated by arrows in FIG. 10.

FIG. 10 also shows two OPCS-4 codes, OCPS-4 code 1 (shown with reference numeral 101) and OCPS-4 code 2 (shown with reference numeral 102). A concept of OCPS-4 code 2 is a sub-concept of OCPS-4 code 1. OPCS-4 code 2 has a synonym list 103 comprising Term A, Term B, and Term C. Since Term A, Term B and Term C are shared between synonym list 66 for ICD-10 code 6 and synonym list 103 for OCPS-4 code 2, the data-mining circuitry 26 determines that a concept of ICD-10 code 6 and a concept of OCPS-4 code 2 may be related. A possible connection between ICD-10 code 6 and OCPS-4 code 2 is illustrated by a dashed arrow 104 in FIG. 10.

Connections between codes may be extended to related codes. For example, if ICD-10 code 6 is related to OCPS-4 code 2, it may also be assumed to be related to OPCS-4 code 1. If OCPS-4 code 2 is related to ICD-10 code 6, it may also be assumed to be related to ICD-10 code 2.

In some embodiments, a coding system is exposed to the user. A user may perform direct navigation via the codes. By determining possible connections between different coding systems, a user may be able to navigate a more complete and unified graph. Modelling relationships between codes and concepts may be made as automatic as possible, with less expert input.

An additional stage may be added to the flow chart of FIG. 2. For example, the additional stage may be added between stage 42 and stage 44. In the additional stage, the data-mining circuitry 26 augments a coding system with suggested new connections or new concepts. The data-mining system may cross-map between ontologies or coding systems. In some embodiments, codes in well-known coding system such as ICD-10 may be mapped to other codes, for example to codes used internally by a hospital or other institution.

In some embodiments, multiple models are trained to classify documents with a given clinical concept. For example, the models may be initialized with different random weights. The different models may return different attention vectors for a given code. For some codes, the different attention vectors pick up different concepts, or different parts of a single concepts. In some embodiments, the difference between attention vectors is used to break down a concept into two or more constituent parts. The two or more constituent parts may be representative of different sub-concepts.

Figure 11:
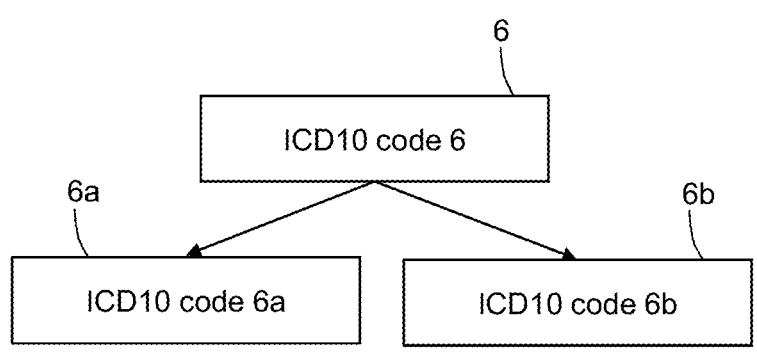
FIG. 11 illustrates an example of a code having related codes for two sub-concepts.

FIG. 11 shows an ICD-10 code 6 having two sub-concepts, ICD-10 code 6a and ICD-10 code 6b. An example of an ICD-10 code is 812.0, Other motor vehicle traffic accident involving collision.

Different attention vectors may produce results that focus on different parts of the concept of code 821.0. In one example, a first attention vector puts more emphasis on words relating to the vehicle collision, for example 'vehicle', 'car', 'speed', 'driver' and 'unrestrained'. A second attention vector that is trained on the same text relating to the same code puts more emphasis on words relating to be directed to the patient's condition following the vehicle collision, for example 'fracture', 'contusion' and 'bone'. The first and second attention vectors may be used to identify corresponding first and second sub-concepts of the concept of code 821.0.

In some embodiments, known relationships between concepts are used. A common attention mechanism may be used for multiple concepts. Related codes may learn at least some of the same terms. For example, a parent code, grandparent code and child code may all learn at least some of the same terms.

In some embodiments, a trained model is used to index documents using terms that receive a high weighting for each of the coded concepts. A search by code will pull up the indexed instances. The search by code may refine the instances found by search string. This approach may enable consideration of negation, uncertainty, laterality and/or coreference resolution.

Figure 12:
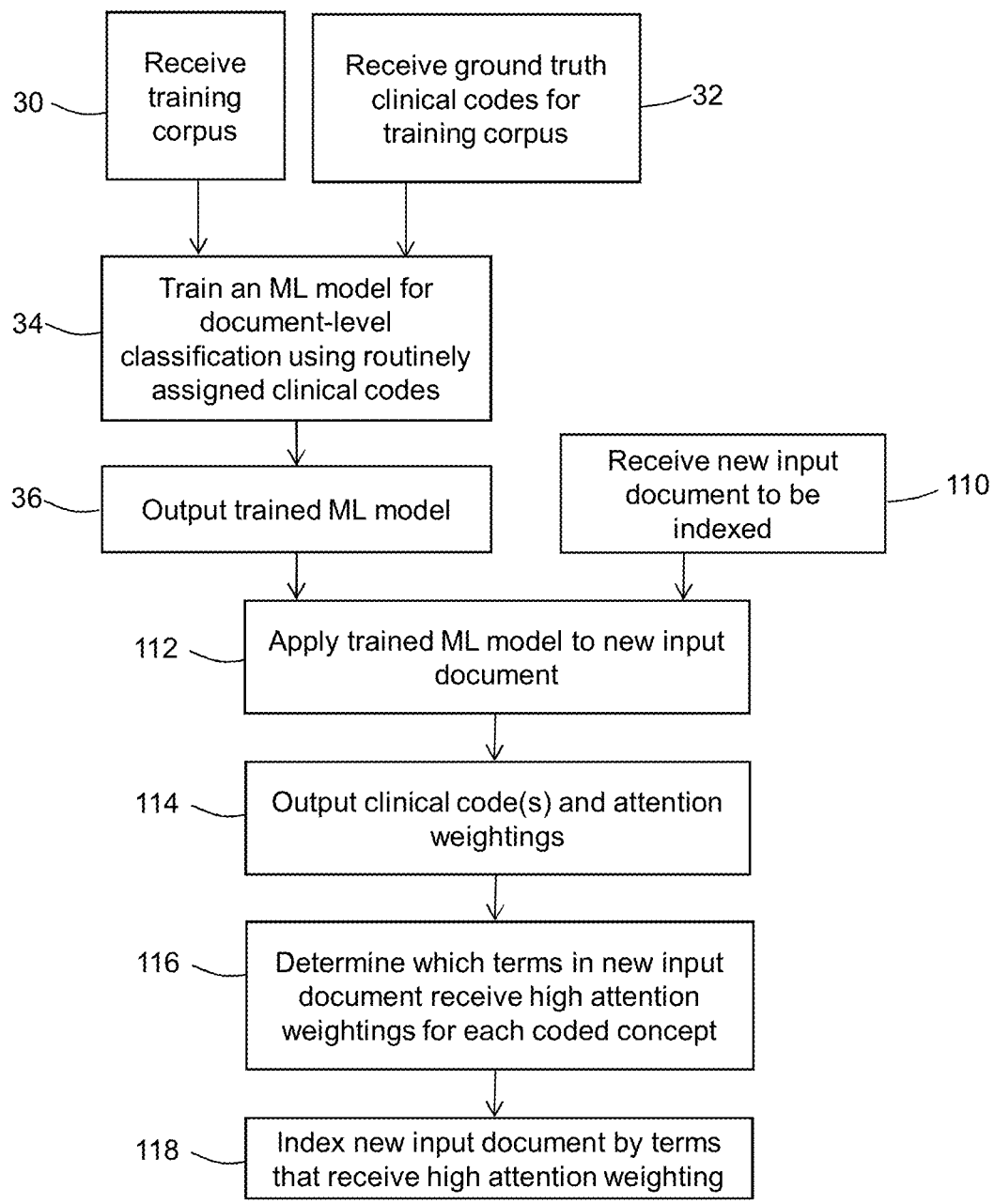
FIG. 12 is a flow chart illustrating in overview an indexing method in accordance with an embodiment.

FIG. 12 is a flow chart illustrating in overview an indexing method in accordance with an embodiment. Apparatus 10 is configured to perform the indexing method of FIG. 12.

Stages 30 to 36 of the method of FIG. 12 are the same as stages 30 to 36 of the method of FIG. 2. At stage 30, the training circuitry 24 receives a training corpus. At stage 32, the training circuitry 24 receives ground truth clinical codes for the training corpus. At stage 34, the training circuitry 24 trains a machine learning model, for example a neural network, to classify documents using a predetermined set of clinical codes. At stage 36, the training circuitry 24 outputs the trained machine learning model. The indexing circuitry 29 receives the trained machine learning model.

At stage 110 of FIG. 12, the indexing circuitry 29 receives a new input document from the data store 20. In other embodiments, the new input document may be received from any suitable data store, for example a data store that forms part of an Electronic Medical Records system or PACS.

The new input document is a text document that is to be indexed. The new input document may be a document that is not part of the training corpus. The new input document may be any medical text document, for example a physician hospital discharge summary.

At stage 112, the indexing circuitry 29 inputs the new input document to the trained machine learning model. The trained machine learning model classifies the new input document with at least one clinical code. The trained machine learning model outputs a respective attention vector for each clinical code with which the new input document is classified. The attention vector comprises a respective attention weighting for each text term in the new input document, for example for each word or group of words in the new input document.

As described above, different instances of a given text term (for example, different instances of a word or group of words) may be given different attention weightings by the trained machine learning model. The attention weighting for a given instance may depend on the context of that instance.

At stage 116, the indexing circuitry 29 determines which of the text terms in the new input document have received high attention weightings for each clinical code. For example, the indexing circuitry 29 may compare attention weightings to a threshold. By determining which of the text terms have received high attention weightings, the indexing circuitry 29 determines which text terms were important to the classification of the new input document with the clinical code.

At stage 118, the indexing circuitry 29 indexes the new input document with the text terms that were found to have high attention weightings.

Figure 13:
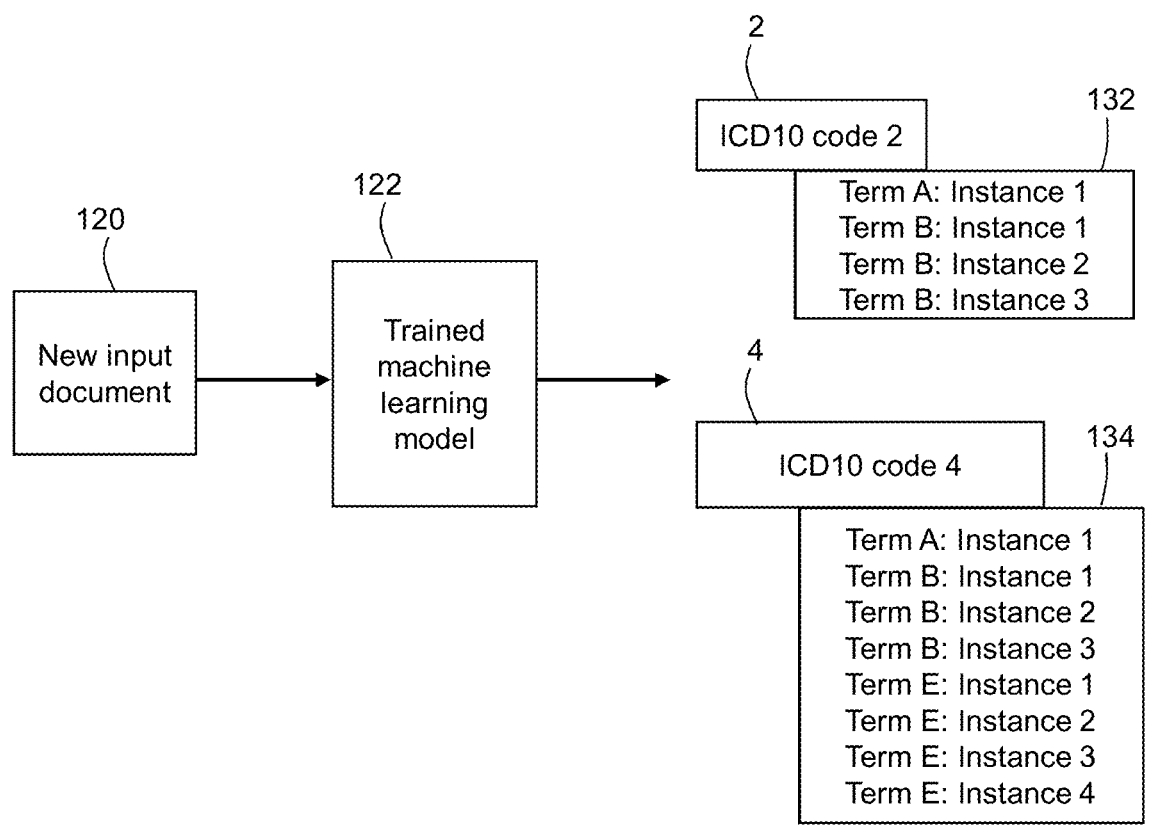
FIG. 13 is a schematic illustration of use of a trained machine learning model in indexing.

FIG. 13 illustrates an example of indexing. A new input document 120 is input into a trained machine learning model 122. The trained machine learning model 122 classifies the new input document 120 with ICD-10 code 2 and ICD-10 code 4.

The indexing circuitry 29 determines a list of instances of terms that have been given a high attention weighting by the trained machine learning model 122. A first list of instances 132 is associated with ICD-code 2. A second list of instances 136 is associated with ICD-code 4.

The first list of instances 132 comprises:
Term A: Instance 1
Term B: Instance 1
Term B: Instance 2
Term B: Instance 3

The thesaurus 60 of FIG. 3 includes a synonym list 62 for ICD-10 code 2. The synonym list 62 includes Term A, Term B, Term C and Term D.

When the trained machine learning model is deployed on a new input document, it may be the case that the new input document does not include some of the text terms in the thesaurus. Alternatively, the new input document may include instances of the text terms that should have low or no relevance to the correct classification of the new input document. For example, a text term may be included as a negative, or in relation to someone other than the patient.

The trained machine learning model may make the decision to classify the new input document with ICD-10 code 2 based on instances of some, but not, all of the synonyms for ICD-10 code 2. Only some synonyms may be given a high attention weighting. Only some instances of those synonyms may be given a high attention weighting. Attention weighting may be dependent on context.

In the example of FIG. 13, only Term A and Term B are found to be important to the classification of new input document 120 with ICD-code 2. The index circuitry 29 indexes the new input document 120 with Term A and Term B. The index circuitry 29 does not index the new input document 120 with Term C or Term D.

A second list of instances 136, which is associated with ICD-code 4, comprises:
Term A: Instance 1
Term B: Instance 1
Term B: Instance 2
Term B: Instance 3
Term E: Instance 1
Term E: Instance 2
Term E: Instance 3
Term E: Instance 4

The thesaurus 60 of FIG. 3 includes a synonym list for ICD-10 code 4. The synonym list 62 includes Term A, Term B, Term E and Term F.

In the example of FIG. 13, Term A, Term B and Term E are found to be important to the classification of new input document 120 with ICD-code 4. The index circuitry 29 indexes the new input document 120 with Term A, Term B and term E. The index circuitry 29 does not index the new input document 120 with Term F.

Use of the trained machine learning to index documents as described above with reference to FIGS. 12 and 13 may provide an intelligent indexing method. A search by clinical code may be refined such that individual terms can be identified and located within documents, in accordance with an importance of individual instances of those terms to the classification process. In contrast to conventional methods, machine learning models as described above may take advantage of contextual cues and return a targeted list of results, by indexing instances from the output of the trained machine learning model.

The indexing process of FIGS. 12 and 13 is performed using the trained machine learning model itself. In contrast, the search phase of FIG. 3 is performed using the thesaurus 60, and does not comprise using the trained machine learning model. In some circumstances, a GPU is used in deployment of the indexing method of FIGS. 12 and 13 to index documents by coded concepts. The GPU may not be required when using the thesaurus 60 to perform document search.

In some embodiments, the machine learning model is continuously trained. For example, the system may be continuously trained according to codes that are routinely assigned to clinical documents at an institution, for example a hospital. Repeated or continuous training may allow opportunities for domain transfer and/or personalization to the institution.

Figure 14:
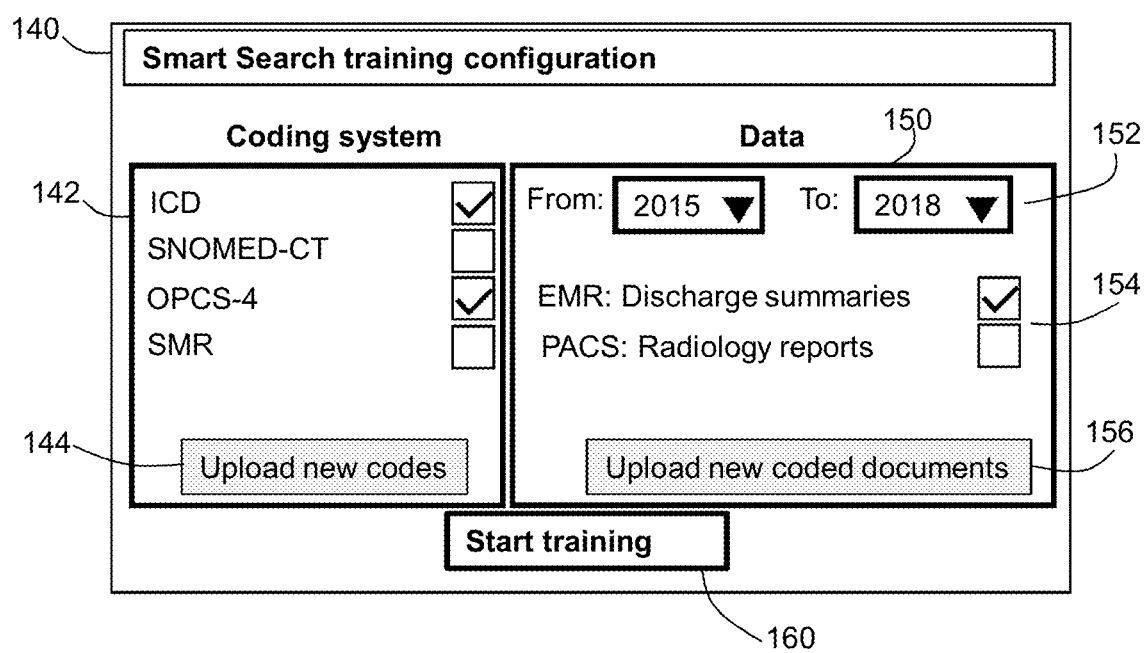
FIG. 14 is a schematic illustration of a user interface in accordance with an embodiment.

FIG. 14 illustrates a simple user interface 140 for continued training of the machine learning model. The user interface 140 is in a smart search training configuration. In other embodiments, any suitable user interface may be used. The content and/or layout of the user interface may differ from that shown in FIG. 14.

In the embodiment of FIG. 14, a trained machine learning model is received by an institution. The trained machine learning model has been trained using data from a different institution or group of institutions. A user wishes to further train the machine learning model on local data from the institution.

A first portion 142 of the user interface 140 relates to the coding system or systems with which the machine learning model is to be trained. The first portion 142 comprises a selectable list of coding systems. In the embodiment of FIG. 14, the coding systems are ICD, SNOMED-CT, OPCS-4 and SMR. The coding systems are selectable by checking boxes corresponding to each of the coding systems. In other embodiments, any suitable coding systems and/or selection method may be used. The user selects at least one coding system of the list of coding systems.

An element 144 of the user interface 140 allows the user to upload new codes. For example, the codes uploaded by the user may be local codes that are not part of any of the coding systems on the list of coding systems.

A second portion 150 of the user interface 140 relates to the data used for training. A selectable data range 152 allows the user to select a date range for data on which the machine learning model to be trained. In the example shown, the selected data range is from 2015 to 2018. Start and end dates are selectable using a drop-down menu. In other embodiments, any suitable method for date input may be used. The user selects a desired date range.

The second portion 150 further comprises a selectable list 154 of document types. In the embodiment of FIG. 14, the document types are EMR discharge summaries and PACS radiology reports. The document types are selectable by checking boxes corresponding to each of the document types. In other embodiments, any suitable document types and/or selection method may be used. The user selects at least one document type.

An element 156 of the user interface 140 allows the user to upload new coded documents. The new coded documents may comprise documents that are not included in the document types on the list of document types and/or documents that are not included in the selected date range.

An element 160 of the user interface 140 allows the user to start training. The user selects element 160 when they wish to start training the machine learning model on the selected coding system, date range, and document types. The machine learning model is trained using the selected coding system, date range, and document types. An updated machine learning model is output.

By training the machine learning model on data from a specific institution, the machine learning model may be tailored to that institution. Performance of the machine learning model may be improved.

In some circumstances, the machine learning model may be trained repeatedly, for example at regular time intervals. By training the machine learning model repeatedly, the machine learning model may be regularly updated with new training data. The updated machine learning model may adapt to any changes in practice, for example changes in clinical note taking or in coding, that occur over time.

Certain embodiments provide a medical text analysis method comprising: training a neural network model with attention mechanism on clinically coded documents, where codes are part of a medical coding system such as ICD or SNOMED CT; mining the terms that are given high weighting in the attention vector for each clinical coded concept; and creating a thesaurus by taking the mined terms and linking these to concepts in the medical coding system.

The method may additionally comprise using the weighting and frequency with which terms are attended to in the neural network attention vectors, in order to rank terms by importance for each coded concept.

The method may additionally comprise indexing documents by the terms which are weighted highly for each coded concept.

The indexing may be used to retrieve search results. The indexing may allow the user to search by medical concept rather than by term.

The method may additionally comprise suggesting new connections between concepts within or between coding systems, allowing automatic cross-mapping between coding systems.

The method may additionally comprise suggesting sub-concepts of existing medical concepts, which can also be searched on.

The method may additionally comprise allowing the user to do personalized institution-specific training. A user may be allowed to control what data and codes the system is trained on.

Certain embodiments provide an apparatus for medical text search comprising a processing circuitry configured to: receive a query for search, specify a medical classification code which the query belongs, find out a medical text which include a keyword which is not identical to the query and belongs to the specified medical classification code.

The processing circuitry may be further configured to find out the medical text based on a frequency of the keyword included in the specified medical classification code.

The processing circuitry may be further configured to receive a threshold information regarding to the frequency, find out the medical text based on the received threshold information.

The processing circuitry may be further configured to specify a plurality of the medical classification code which the query belongs.

The processing circuitry may be further configured to receive a plurality of the query.

Certain embodiments provide a medical text analysis method comprising: training a model on a training set of clinically coded documents, each clinically coded document comprising or having associated with it at least one label comprising code(s) of a clinical coding system; the training comprising generating for each of the codes of the clinical coding system a respective associated set of text terms extracted from the training set of clinically coded documents; the method further comprising using the generated sets of text terms in a process of searching or indexing further medical documents.

The model may comprise a neural network.

The training may comprise assigning respective relevance or importance scores to the extracted text terms, and optionally using the relevance or importance scores in subsequent searching or indexing.

For at least one of the text terms, the text term may have a different relevance or importance score for its use in relation to a first one of the codes of the clinical coding system than for its use in relation to a second one of the codes of the clinical coding system.

The extracted sets of text terms may comprise natural language words or phrases to supplement more formal clinical terms of the clinical coding system.

The using of the generated sets of text in a process of searching or indexing further medical documents may comprise: receiving a search term from a user via a user interface; proposing further search terms and/or clinical codes, or conducting the search additionally using said further search terms or clinical codes, based on the received search term and on the generated sets of text terms.

The method may further comprise matching the received search term with one or more items in the generated sets of text terms and associated clinical codes, and proposing further search terms from the generated sets of text terms and associated clinical codes based on the matching.

Using the generated sets of text terms in a process of searching or indexing further medical documents may comprise indexing a medical document with one or more of the text terms and/or with one or more of the codes, based on the content of the medical document and on the generated sets of text terms.

The clinical coding system may comprise synonym lists associated with the clinical codes and the training may comprise generating additional synonyms for said synonym lists.

The training may comprise generating additional codes or concepts for use in indexing or searching, to supplement the codes of the clinically coding system.

The method may further comprise creating connections between codes of the clinical coding system based on the generated sets of text terms, and using the connections in searching, indexing or representing the coding system.

The method may further comprise creating sub-codes or sub-concepts in respect of the codes of the clinical coding system based on the generated sets of text terms.

The clinical coding system may comprise the ICD or SNOMED CT system.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for medical text processing, comprising: processing circuitry configured to:
   obtain a trained model, the trained model being trained to classify medical text documents with a medical classification code;
   apply the trained model to at least one medical text document to obtain attention weightings for text terms included in the at least one medical text document, the attention weightings being associated with the medical classification code; and
   use the attention weightings to perform a searching process including:
      using the attention weightings to obtain a list of keywords associated with the medical classification code;
      receiving at least one further medical text document for search;
      receiving a query term for search;
      specifying that the medical classification code is associated with the query term;
      determining the list of keywords, which is associated with the medical classification code specified;
      using the list of keywords associated with the medical classification code to find a plurality of text portions in the at least one further medical text document, each text portion including a respective keyword of the list of keywords and the respective keyword not being identical to the query term;
      using the attention weightings to obtain a respective importance score for each of the plurality of text portions; and
      ranking the plurality of text portions in dependence on the obtained importance scores.

2. The apparatus of claim 1, wherein the obtaining of the list of keywords and/or the finding of the text portions is based on a frequency with which each keyword is included in medical text documents classified with the medical classification code.

3. The apparatus of claim 1, wherein
   the processing circuitry is further configured to receive a threshold value; and
   the obtaining of the list of keywords and/or the finding of the text portions includes applying the threshold value to the attention weightings or to the respective importance scores obtained from the attention weightings.

4. The apparatus of claim 1, wherein the processing circuitry is further configured to specify a plurality of medical classification codes to which the query belongs.

5. The apparatus of claim 1, wherein
   the processing circuitry is further configured to receive a plurality of query terms and specify that the medical classification code is associated with the plurality of query terms, and
   each keyword is not identical to any of the query terms.

6. The apparatus of claim 1, wherein the obtaining of the list of keywords and/or the finding of the text portions includes assigning the respective importance scores to the text terms.

7. The apparatus of claim 6, wherein the processing circuitry is further configured to:
   rank the list of keywords in accordance with the respective importance scores, and/or
   rank the text portions found in the at least one further medical text document in accordance with the respective importance scores.

8. The apparatus of claim 6, wherein
   the trained model is further trained to classify medical text documents with a further medical classification code, and
   for at least one particular text term of the text terms, the particular text term has a first importance score in relation to the medical classification code and a second, different importance score in relation to the further medical classification code.

9. The apparatus of claim 1, wherein the searching process includes allowing a user to search by concept and/or by text term.

10. The apparatus of claim 1, wherein
    the medical classification code forms part of a first clinical coding system, and
    the processing circuitry is further configured to suggest at least one connection between the first clinical coding system and a second, different clinical coding system.

11. The apparatus of claim 1, wherein the processing circuitry is further configured to suggest at least one sub-concept for the medical classification code.

12. The apparatus of claim 1, wherein the obtaining of the trained model includes performing a training process to train a model using a set of training documents that are classified with ground truth medical classification codes.

13. The apparatus of claim 12, wherein the obtaining of the trained model further includes updating the training of the model using a further set of training documents that are specific to at institution and/or at least one coding system and/or at least one date range.

14. An apparatus for medical text processing, comprising:
processing circuitry configured to:
 obtain a list of keywords associated with a medical classification code, the list of keywords having been obtained by applying a trained model to at least one medical text document to obtain attention weightings for text terms included in the at least one medical text document, the trained model being trained to classify medical text documents with the medical classification code, and the attention weightings being associated with the medical classification code; and
 perform a searching process comprising:
  receiving at least one further medical text document for search;
  receiving a query term for search;
  specifying that the medical classification code is associated with the query term;
  determining the list of keywords, which is associated with the medical classification code specified;
  using the list of keywords associated with the medical classification code to find a plurality of text portions in the at least one further medical text document, each text portion including a respective keyword of the list of keywords and the respective keyword not being identical to the query term,
  using the attention weightings to obtain a respective importance score for each of the plurality of text portions; and
  ranking the plurality of text portions in dependence on the obtained importance scores.

15. A method comprising:
 obtaining, via processing circuitry, a trained model, the trained model being trained to classify medical text documents with a medical classification code;
 applying, via the processing circuitry, the trained model to at least one medical text document to obtain attention weightings for text terms included in the at least one medical text document, the attention weightings being associated with the medical classification code; and
 using, via the processing circuitry, the attention weightings to perform a searching process including:
  using the attention weightings to obtain a list of keywords associated with the medical classification code;
  receiving at least one further medical text document for search;
  receiving a query term for search;
  specifying that the medical classification code is associated with the query term;
  determining the list of keywords, which is associated with the medical classification code specified;
  using the list of keywords associated with the medical classification code to find a plurality of text portions in the at least one further medical text document, each text portion including a respective keyword of the list of keywords and the respective keyword not being identical to the query term,
  using the attention weightings to obtain a respective importance score for each of the plurality of text portions; and
  ranking the plurality of text portions in dependence on the obtained importance scores.

\* \* \* \* \*